(12) United States Patent
Heuer et al.

(10) Patent No.: US 7,249,517 B2
(45) Date of Patent: Jul. 31, 2007

(54) PRESSURE TRANSMITTER WITH POWER CYCLED HALL EFFECT SENSOR

(75) Inventors: Daniel A. Heuer, New Carlisle, IN (US); Shannon Edwards, LaPorte, IN (US)

(73) Assignee: Dwyer Instruments, Inc., Michigan City, IN (US)

( * ) Notice: Subject to any disclaimer, the term of this patent is extended or adjusted under 35 U.S.C. 154(b) by 25 days.

(21) Appl. No.: 11/047,963

(22) Filed: Feb. 1, 2005

(65) Prior Publication Data
US 2005/0193824 A1 Sep. 8, 2005

Related U.S. Application Data

(60) Provisional application No. 60/541,136, filed on Feb. 2, 2004.

(51) Int. Cl.
*G01L 9/10* (2006.01)
(52) U.S. Cl. ........................................ 73/722
(58) Field of Classification Search ................. 73/718, 73/722, 724, 728, 723, 861.61
See application file for complete search history.

(56) References Cited

U.S. PATENT DOCUMENTS 3,575,054 A * 4/1971 Glista ........................... 73/701
4,361,835 A 11/1982 Nagy
4,484,173 A 11/1984 Everett
4,589,282 A 5/1986 Dumery
4,606,229 A 8/1986 Spence
4,665,938 A 5/1987 Brown et al.
5,502,383 A 3/1996 Funami et al.
5,619,137 A 4/1997 Vig et al.
5,817,943 A * 10/1998 Welles et al. ................. 73/718
6,014,100 A 1/2000 Fehrenbach et al.
6,089,098 A 7/2000 Tylisz et al.

FOREIGN PATENT DOCUMENTS

GB 2247316 A * 2/1992

OTHER PUBLICATIONS

Micronas, Sensors Overview and System Solutions, Copyright 2004.
Datel, 4-20mA Current Loop Primer.
Fairchild Semiconductor, BSS84 P-Channel Enhancement Mode Field Effect Transistor, Jul. 2002.

* cited by examiner

*Primary Examiner*—Jewel Thompson
(74) *Attorney, Agent, or Firm*—Barnes & Thornburg LLP

(57) ABSTRACT

The invention disclosed herein is a pressure transducer utilizing a Hall effect sensor to detect the displacement of the transducer's diaphragm. The pressure transducer includes a power supply to draw current from a 4 mA to 20 mA current loop and deliver current to the Hall effect sensor at an average rate of 4 mA or less.

23 Claims, 3 Drawing Sheets

PRESSURE TRANSMITTER WITH POWER CYCLED HALL EFFECT SENSOR

RELATED APPLICATIONS

This Application claims the benefit of U.S. Provisional Application No. 60/541,136, filed on Feb. 2, 2004.

FIELD OF THE INVENTION

The invention relates to differential pressure transducers and transmitters for measuring the pressure of a fluid.

BACKGROUND OF THE INVENTION

The invention described herein is a pressure transducer utilizing a magnet and Hall effect sensor to convert mechanical movement into electrical signals. The pressure transducer without a Hall effect sensor is well understood in the art. A pressure transducer typically includes two plenums or chambers separated by a flexible diaphragm. The plenums are subject to a fluid, such as a gas or a liquid, under different pressures. This pressure differential causes displacement of the diaphragm in the direction of the plenum exposed to the lower pressure. The diaphragm is connected to a mechanical component, which moves as the diaphragm is displaced.

For example, the mechanical component could be a piezoelectric strip having two ends, one end fixed to a plenum wall or other fixed point of reference and the other end fixed to the diaphragm, and thus moving with the diaphragm. The electrical properties of the piezoelectric strip change as it is bent by the movement of the diaphragm. The electrical change can then be processed by other electrical components to indicate the pressure value. Other devices to convert the mechanical movement into electric signals are also used to convert the movement of the diaphragm as recognized by one skilled in the art.

In the present invention, a magnet and Hall effect sensor are used to convert the mechanical movement to electric signals. It should be understood that the power conserving features of the invention disclosed herein need not be limited to the use of a Hall effect device, but may be applied to implementations using other structures for sensing movement as well. The power circuit can also be used in other applications where a low average current draw is required.

The use of a Hall effect sensor and a magnet allows for physical separation of the mechanical and electrical components of the pressure transducer, since the interaction between the magnet and the Hall effect sensor can take place with material between them. The preferred embodiment shows an arrangement where the fluid in the differential pressure sensor and the mechanical beam and magnet are separated from the electronics, including the Hall effect sensor, by a wall.

Many pressure transmitter applications use a 4 to 20 mA current loop to operate. In such instances, the 4 to 20 mA current loop provides both device power and signal path for the control signal. Most current loops used in the applications are specified to run between 10 and 35V supply voltage. As a result of the supply voltage and current constraints, the pressure transmitter should be capable of operation at a power level equal to the lowest power available, or 4 mA×10V=40 mWatts. In other words, because the power available can vary with the current signal, and from application to application, the maximum amount of power that can be relied upon is 40 m Watts. Thus, the device needs to be able to run on that amount of power, even if a higher amount is available in some applications.

A problem arises in that most Hall effect devices available today consume more power than 40 mW. For example, the HAL805 and HAL810 available from Micronas need at least 10 mA of current available at a minimum of 4.5V to work. This is a minimum power load of 10 mA×4.5V=45 mW to achieve operation. With such power requirements, not only is there no power left over to run the rest of the transmitter, there is not enough power to run the Hall effect sensor itself.

The problem is solved by alternately applying Power to the Hall sensor, making a measurement, then removing power for an extended time interval. In such a fashion, the duty cycle of the Hall sensor is adjusted. The position of the diaphragm or beam of the transducer does not need to be continuously monitored. In most applications, the Hall effect sensor can be turned off for substantial portions of the time, thus saving substantial amounts of power. In typical applications, the duty cycle of the sensor can be set anywhere from 1:2 to 1:100, although other ranges beyond those figures are possible. While other ranges are possible, the limitations of the average current draw and surge current to the sensor still must be achieved. In some embodiments, the duty cycle or period applying power can be selectively varied by the user. Such a selective circuit may include a multi-position switch, or other structure to allow a user to select from a plurality of timing circuits.

In the case of an integrated semiconductor sensor, such as the HAL810 from Micronas, the sensor can be turned on and a stabilized reading made in approximately 40 mSeconds. If a reading is taken once every 400 mSeconds, the average power requirement of the sensor can be reduced by a factor of ten. This means the average power draw of the Hall effect sensor is reduced to 4.5 mW for an average current draw from the sensor of only 1 mA at 4.5 volts. This is an amount of power that can be delivered to the sensor in a current loop situation. The remaining approximately 35 mW of available power can be used to run the rest of the transmitter.

Similarly acceptable duty cycles can be done with most other Hall effect sensors depending upon their power draw and start up and stabilization times. To achieve the power reduction, a suitable power supply is needed for the Hall effect sensor that can draw energy from the 4 to 20 mA loop on the average basis and deliver energy to the Hall effect sensor on the peak basis that the sensor requires. As described in the preferred embodiment, a low pass filter is utilized to draw power from the current loop and store the power until it is provided to power the Hall effect sensor. One skilled in the art will recognize that the power supply described herein is but one of many power supplies that can meet the goals described above.

DETAILED DESCRIPTION OF THE PREFERRED EMBODIMENT

Figure 1:
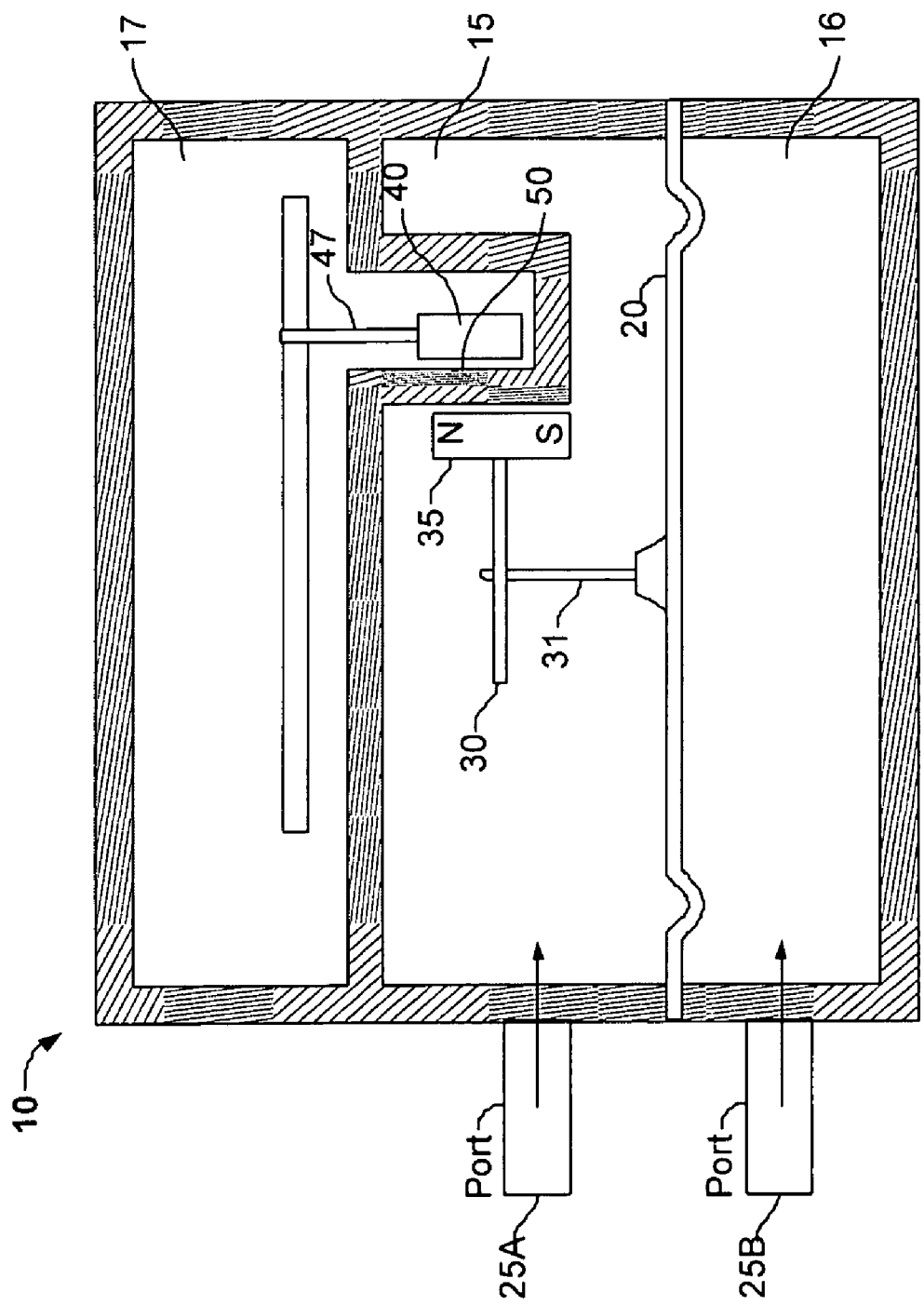
FIG. 1 is a sectional view of a three chamber pressure transducer incorporating a Hall effect sensor.

With reference to FIG. 1, the pressure transducer 10 includes three isolated chambers or plenums, an upper pressure chamber 15 above the diaphragm 20, a lower pressure chamber 16 below the diaphragm 20, and a separate electronics chamber 17 above the upper pressure chamber 15. A flexible diaphragm 20 separates the upper and lower chambers. The upper chamber 15 and the lower chamber 16 include ports 25A and 25B to allow fluid communication with the plenums defined by their respective walls. The upper chamber 15 includes a beam 30 affixed to the diaphragm 20. The beam 30 is coupled to and moves in conjoined relationship with the diaphragm 20. In the preferred embodiment, the beam 30 is coupled to the diaphragm 20 by a post 31 extending perpendicularly from the diaphragm 20. A magnet 35 is attached to one end of the beam 30. The beam 30 is attached to the post 31, so that the beam 30 and magnet 35 are generally balanced about the post 31, so as to minimize any twisting forces on the diaphragm 20. One skilled in the art will recognize that the beam and post can take on many different shapes and configurations. In the preferred embodiment, the beam 30 is a spring upon which the diaphragm 20 applies a force proportional to the differential pressure on either side of the diaphragm 20. Movement of the spring is in proportion to the force applied and hence displacement of the magnet 35 is in direct proportion to the differential pressure. Other structures to convey the movement of the diaphragm 20 to the magnet 35 are possible.

In other embodiments, the post 31 and beam 30 may be eliminated, and the magnet 35 attached directly to the diaphragm 20. Alternatively, a single structural member may attach the magnet 35 to the diaphragm 20.

The magnet 35 is positioned in working relationship with a Hall effect sensor 40 located in the electronics chamber 17, thus permitting the magnetic field of the magnet 35 to generate a voltage response or signal in the Hall effect sensor 40. Although in the preferred embodiment the Hall effect sensor 40 is located in a separate chamber from the magnet 35, one skilled in the art will recognize that the Hall effect sensor 40 need not be located in the electronics chamber 17, but may be located in the same chamber as the beam 30 or magnet 35. The Hall effect sensor 40 and magnet 35, power supply described herein may be used with two-chambered transducers, not needing a separate chamber for the electronics. Thereby, one skilled in the art will recognize the Hall effect sensor 40 could also be placed in the lower pressure chamber 16.

Because the Hall effect sensor 40 is not in direct contact with the beam 30 or magnet 35, a chamber wall 50 may be placed between the Hall effect sensor 40 and the beam 30 or the magnet 35. As shown in the preferred embodiment, the Hall effect sensor 40 and the magnet 35 are separated by the wall 50 defining the division between the electronics chamber 17 and the upper pressure chamber 15. With this arrangement, the electronics of the transducer are separated from the fluid being monitored. As one skilled in the art will recognize from the teachings of this invention, the electronics chamber 17 may be eliminated, and the electronics, including the Hall effect sensor 40 can reside on the outside of the housing defining the outer boundaries of the upper pressure chamber 15 and the lower pressure chamber 16. However, placing the electronics in a separate chamber provides protection from environmental elements, and is preferred.

In the preferred embodiment, the electronics chamber 17 includes the Hall effect sensor 40 positioned so that it is magnetically coupled with the magnet 35. The Hall effect sensor 40 includes wiring or other electronic pathways 47 to connect the Hall effect sensor to suitable electronic circuitry for displaying pressure information, or transmitting pressure information to control electronics. One skilled in the art will readily recognize such a transmitter or display circuitry would convert the voltage response of the Hall effect sensor 40 into a current signal and transmit the signal on the current loop.

With careful selections of a sensor, the arrangement in FIG. 1 senses the motion of the beam 30 linearly. Thus, the arrangement is useful for pressure transmitters as well as pressure switches.

Figure 2:
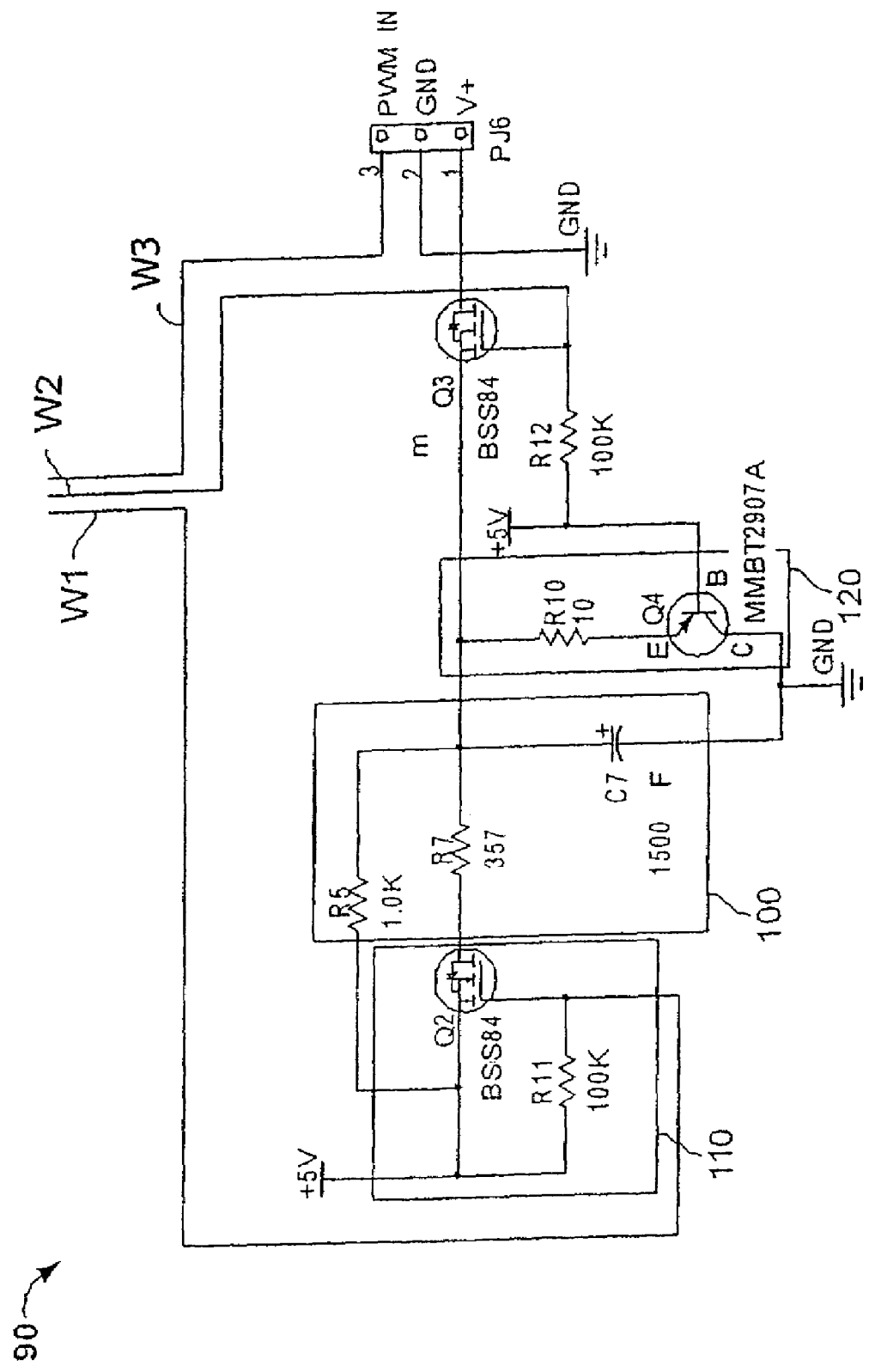
FIG. 2 is an electrical schematic of the preferred embodiment for a Hall effect device power supply.

FIG. 2 shows an implementation of a power supply 90 for the HAL810 Hall effect sensor of the preferred embodiment. It can be easily adapted to other Hall effect sensors. The 5 volt supply shown in the power supply schematic of FIG. 2 is derived from a linear regulator (not shown) running from the 10 to 35 Volt input of the current loop. This 5V supply also supplies all the other transmitter power requirements. The linear regulator is preferred because it is usually the lowest cost method of providing power even though it limits the available power to the entire transmitter to 4 mA at 5 volts or 5V×4 mA=20 mW. If more power is needed the linear regulator can be replace by a switching regulator and nearly 100% of the 40 mW available can be achieved depending upon the efficiency of the switching regulator.

The basic concept of the supply is to low pass filter the supply current drawn by the Hall effect sensor such that only the average current of the sensor is drawn from the 5V supply. The supply is electrically connected to and forms part of the current loop by wires W1 and W2. Capacitor C7 along with resistors R5 and R7 and Q2 form the low pass filter 100 when Q2 is on. An average current is drawn through the resistors R5 and R7 and transistor Q2 based on the average voltage difference between the 5V supply and the voltage across C7. The ripple in the average current is determined by how much the voltage across C7 changes when Q3 is turned on and current is supplied to the Hall effect sensor (not shown) through its connection to connector PJ6. The voltage across C7 must remain high enough to meet the minimum voltage requirements of the Hall effect sensor. Ideally C7 would go to an infinite capacitance as the resistance goes to zero. As long as the minimum supply voltage for the Hall effect sensor is less than the minimum voltage of the 5V supply a practical compromise for the values can always be found. In the preferred embodiment, the resistor and capacitor values are selected to provide a 1:9 duty cycle. Such a cycle provides power to the Hall effect sensor for 40 mSec, and charges for 360 mSec. Other duty cycles may work so long as the average current draw is below 4 mA, and the surge current to power the sensor is at least 4 mA for a time duration necessary to obtain a stable reading.

The purpose of transistor Q2 and resistor R11 is to form a start up circuit 110 for start up conditions. Because C7 starts at complete discharge, the current draw on the 5V supply can be higher than what is available. By separating the start up charging resistor value from the running value, the start up surge can be limited.

Q4 and R10 form a discharge circuit 120 to provide a quick discharge path for C7 when the 5V supply shuts down. This prevents C7 from back feeding the 5V supply and causing a poor shutdown for the transmitter. Other supply arrangements that smooth the current draw from the 4 to 20 mA loop are possible.

When powered, the Hall effect sensor 40 provides a signal to wire W3. The signal may be a voltage response, or, more preferred, the signal is a pulse width modulated voltage signal. The type of signal will depend on the output of the sensor 40. In other embodiments, the signal may be a current signal, or other stream of data. In the case of a signal based on voltage, the signal is thereafter conveyed to a transmitter to convert the signal to a current signal for transmission in the current loop.

Figure 3:
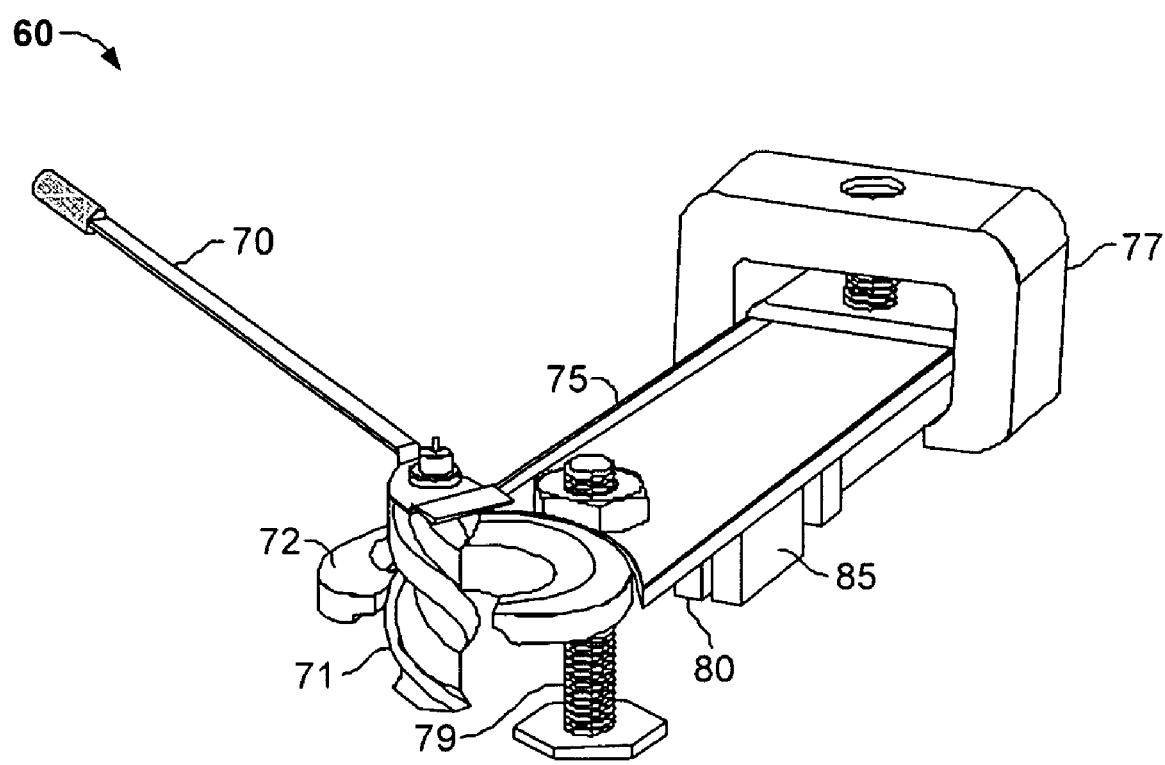
FIG. 3 is a perspective view showing the positioning of a Hall effect sensor and magnet on a pointer display instrument.

FIG. 3 shows the invention as part of a pointer display instrument. The instrument 60 includes a pointer 70 which moves in response to a force induced on the helix 71 by the c-shaped magnet 72. The c-shaped magnet 72 is mounted to one end of a leaf spring 75, while the other end of the leaf spring 75 is anchored by clamp 77. The leaf spring 75 is coupled to the diaphragm (not shown) by post 79, allowing the leaf spring 75 and the c-shaped magnet 72 to move as the diaphragm is displaced by the differential pressure exerted on it. As the c-shaped magnet 72 moves, it magnetically interacts with the helix 71, causing the pointer 70 to move.

A Hall effect sensor is placed so it is magnetically coupled to the c-shaped magnet 72, to thereby produce an electric signal corresponding to the movement of the c-shaped magnet. In the alternative, a separate magnet 80 can be placed on or coupled to the leaf spring 75. A Hall effect sensor 85 is placed in proximity to the magnet 80, to produce a signal when the magnet moves.

Using this arrangement, the same beam deflection controls both the pointer and transmitter and is done without adding inaccuracy to either output. This allows the addition of transmitter capability to existing pointer display designs with a minimum of additional parts. Thus, the invention described herein can be used with a wide variety of indicators, consistent with the general principles described herein.

What is claimed is:

1. A pressure transducer for monitoring the pressure of a fluid including:
   a housing including a first plenum and second plenum, the plenums being separated by a diaphragm, each plenum having a port for exposing the plenum to a respective pressure;
   a magnet coupled to the diaphragm; and
   a Hall effect sensor magnetically coupled to the magnet, said Hall effect sensor producing an electric signal in relation to the displacement of the diaphragm, wherein the Hall effect sensor is located outside of the plenum housing the magnet.

2. The pressure transducer of claim 1, including a third plenum, the third plenum being located adjacent to the second plenum, the second plenum housing the magnet, the third plenum housing the Hall effect sensor.

3. The pressure transducer of claim 2, wherein the third plenum houses the electronics to power the Hall effect sensor.

4. The pressure transducer of claim 3, wherein the electronics intermittently provide power to the Hall effect sensor.

5. A pressure transducer including:
   a housing having a first chamber and a second chamber,
   a diaphragm forming a wall between the chambers,
   a magnet coupled to the diaphragm,
   a Hall effect sensor positioned in proximity to the magnet so as to produce a signal in response to the magnetic flux produced by the magnet,
   an electronic circuit to power the Hall effect sensor, the electronic circuit electrically connected to draw power from a 4 to 20 mA current loop.

6. The pressure transducer of claim 5, wherein the electronic circuit periodically provides power to the Hall effect sensor.

7. The pressure transducer of claim 5, wherein the power is periodically provided to the Hall effect sensor with a period of 400 mS.

8. The pressure transducer of claim 5, wherein the electronic circuit includes a low pass filter between the current loop and the Hall effect sensor.

9. The pressure transducer of claim 8, further including a voltage regulator electrically connected between the low pass filter and the current loop.

10. The pressure transducer of claim 5, wherein the electronic circuit includes a circuit to vary the resistance between a start up value and a running value.

11. The pressure transducer of claim 5, wherein the electronic circuit selectively powers the Hall effect sensor so as to draw 4 mA or less on average from the current loop.

12. The pressure transducer of claim 11, wherein the electronic circuit includes a first resistance at start up and a second resistance during the powering of the Hall effect sensor.

13. A method of generating an electronic signal in response to a pressure differential including the steps of:
   providing a housing having first and second chambers for receiving a fluid under pressure, the chambers separated by a diaphragm;
   providing a magnet in the first chamber coupled to the diaphragm;
   providing a Hall effect sensor in the second chamber, in proximity to the magnet such that the magnetic field of the magnet produces a voltage response in the sensor; and
   monitoring the voltage response of the sensor to determine the position of the diaphragm.

14. The method of claim 13, further including:
   providing a current loop of not less than 4 mA to provide power to the Hall effect sensor.

15. The method of claim 14, further including:
   converting the voltage response of the Hall effect sensor to a current signal, and transmitting the current signal in the current loop.

16. A pressure transducer for monitoring the pressure of a fluid including:
   a housing including a first plenum and second plenum, the plenums being separated by a diaphragm, each plenum having a port for exposing the plenum to a respective pressure;
   a magnet coupled to the diaphragm;
   a Hall effect sensor magnetically coupled to the magnet, said Hall effect sensor producing
   an electric signal in relation to the displacement of the diaphragm,
   wherein the sensor draws power from:
   a low pass filter electrically connected to a process control current loop.

17. The apparatus of claim 16, further including a start up circuit electrically connected between the current loop and the low pass filter, the start up current limiting the current draw of the low pass filter.

18. The apparatus of claim 16, wherein the sensor is a Hall effect sensor, producing a signal proportional to the magnetic flux.

19. The apparatus of claim 18, further including a transmitter to convert the signal to a current signal in the current loop.

20. The apparatus claim 16, further including a voltage regulator to provide a reference voltage.

21. The apparatus of claim 16, wherein the low pass filter draws 4 mA or less from the current loop.

22. The apparatus of claim 21 wherein the sensor has a selectable duty cycle which is selectable within the range of 1:2 to 1:100.

23. The apparatus of claim 21 wherein the sensor has 1:9 duty cycle.

* * * * *